United States Patent [19]

Sugita

[11] Patent Number: 5,295,636

[45] Date of Patent: Mar. 22, 1994

[54] CASSETTE TAPE WITH SUBJECTIVELY DETERMINED STOP POSITION

[75] Inventor: Masaru Sugita, Tokyo, Japan

[73] Assignee: TDK Corporation, Tokyo, Japan

[21] Appl. No.: 725,977

[22] Filed: Jul. 5, 1991

[30] Foreign Application Priority Data

Jul. 7, 1990 [JP] Japan .................... 2-72496[U]
Nov. 9, 1990 [JP] Japan .................... 2-118055[U]
Nov. 30, 1990 [JP] Japan .................... 2-130780[U]

[51] Int. Cl.$^5$ .................... B65H 23/02; G11B 15/22
[52] U.S. Cl. .................... 242/197; 242/189; 242/199
[58] Field of Search ............ 242/186, 189, 197, 198, 242/199, 188; 360/132

[56] References Cited

U.S. PATENT DOCUMENTS

| | | | |
|---|---|---|---|
| 2,927,975 | 3/1960 | Jamieson | 242/188 |
| 3,217,996 | 11/1965 | Bernier | 242/188 |
| 3,501,103 | 3/1970 | Kelley | 242/188 |
| 3,583,617 | 6/1971 | Kosaka | 242/188 |
| 3,666,203 | 5/1972 | Sato et al. | 242/188 |
| 3,861,619 | 1/1975 | Wolff | 242/188 |
| 4,091,426 | 5/1978 | Umeda | 242/188 |
| 4,405,096 | 9/1983 | Possl | 242/199 |
| 4,410,148 | 10/1983 | Dunlap | 242/188 |
| 4,492,993 | 1/1985 | Otis | 242/188 |
| 4,615,682 | 10/1986 | Salvo | 242/188 |

FOREIGN PATENT DOCUMENTS

| | | |
|---|---|---|
| 0064859 | 5/1982 | European Pat. Off. . |
| 0266983 | 10/1987 | European Pat. Off. . |
| WO81/00480 | 2/1981 | World Int. Prop. O. . |
| WO84/01657 | 4/1984 | World Int. Prop. O. . |
| WO86/06536 | 4/1985 | World Int. Prop. O. . |
| WO86/02481 | 4/1986 | World Int. Prop. O. . |

*Primary Examiner*—Daniel P. Stodola
*Assistant Examiner*—John Q. Nguyen
*Attorney, Agent, or Firm*—Price, Gess & Ubell

[57] ABSTRACT

A recording and reproducing tape cassette. The tape cassette has a housing, a pair of reels, and an adjusting device for stopping the feeding of the tape at an arbitrary position along the longitudinal direction of the tape. This adjusting device detects the arrival of the tape at the stopping position when the tape is reproduced by a tape recorder/reproducer to stop feeding of the tape by mechanically operating the tape or an automatic device of the tape recorder/reproducer.

10 Claims, 5 Drawing Sheets

CASSETTE TAPE WITH SUBJECTIVELY DETERMINED STOP POSITION

BACKGROUND OF THE INVENTION

1. Field of the Invention

This invention relates to a cassette tape which contains a magnetic tape in a case for recording and reproducing and, more particularly, to a cassette tape capable of regulating a range of an object to be recorded and reproduced within a range of the length of its tape.

2. Description of Related Art

In conventional cassette tapes which include all ordinary type and endless type, the lengths of the respective tapes have been determined fixedly in response to recording and reproducing time, but the cassette tape itself could not be set or regulated in a range of the available length at all. In most of the conventional ordinary tape recorder/reproducer systems frequently used, the fact that the tape reached its end during recording or reproducing was detected according to the tension of the tape thereby to stop feeding of the tape or to automatically reversely feed the tape. In the systems of such a type, it was impossible to automatically stop feeding of the tape at its arbitrary position by designating in advance the arbitrary position of the tape or to automatically reversely feed the tape.

Therefore, if required recording time of the tape is different, another cassette tape having a different length must be employed, and, hence it was necessary to previously prepare various cassette tapes having a variety of lengths and to select any of the cassette tapes having the length of the tape which matches the required recording time for each time. However, the conventional cassette tapes sold in the general market are sorted according to the lengths of recording time, but the number of the types of the cassette tapes having different lengths is not so sufficient, and cannot respond to certain utility. As an example, in the case where training or learning of a foreign language is repeated by using cassette tapes, the lengths of phrases and sentences to be repeated include a number of kinds. Even if cassette tapes preferably responding to the training or learning of the language are desired to be selected, it is extremely rare to select the cassette tapes just in response to the required recording time. In the case of a cassette tape having a short length, an object to be recorded can fail to be sufficiently recorded on the tape, or in the case of a cassette tape having an excessively long length, an unrecorded portion of the tape remains, and a difficulty in the operation might frequently occur.

Even in the above cases, however, it is very difficult in techniques to prepare a variety of cassette tapes having a number of different lengths in response to objects to be presumed to be recorded, to measure required recording time at each time and to then select a suitable one from the various cassette tapes and to sequentially frequently exchange the tapes.

SUMMARY OF THE INVENTION

Accordingly, an object of this invention is to provide a cassette tape which can eliminate the above-described drawbacks of the prior art and in which the length of recording and reproducing time can be readily adjusted by the tape itself.

According to this invention, this cassette tape comprises a pair of reels, a tape, a cassette case, and means for stopping the feeding of the tape at an arbitrary position in the longitudinal direction of the tape. The means for stopping the feeding of the tape detects the arrival of the tape at the position for stopping the feeding of the tape in the case of reproducing in the tape recorder/reproducer system to mechanically operate an automatic unit of the tape or the tape recorder/reproducer system, thereby stopping the feeding of the tape.

These and other objects and effects of the present invention will become apparent from the following detailed description in conjunction with the attached drawings.

DESCRIPTION OF THE PREFERRED EMBODIMENT

Figure 1:
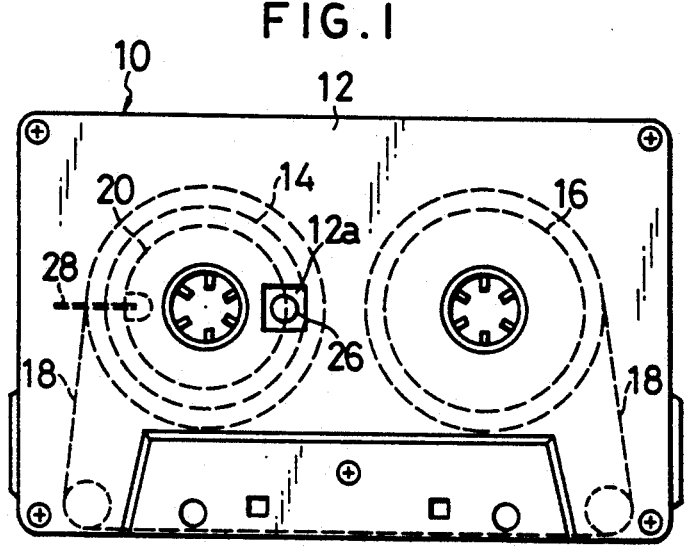
FIG. 1 is a plan view showing an embodiment of a cassette tape of this invention.
Figure 2:
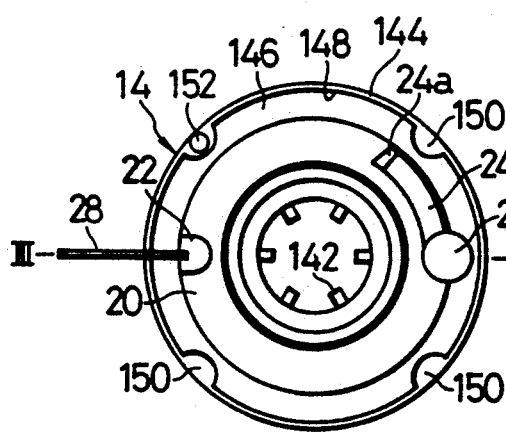
FIG. 2 is an enlarged plan view of a reel unit of the cassette tape of FIG. 1, illustrating the state that a tape length adjusting mechanism is not operated.
Figure 4:
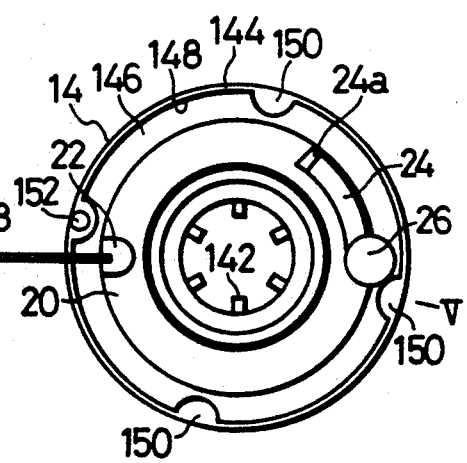
FIG. 4 is an enlarged plan view similar to FIG. 2, illustrating the state that a tape length adjusting mechanism is operated.
Figure 3:
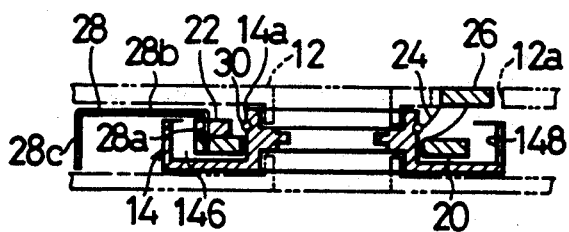
FIG. 3 is a sectional view taken along the line III—III of FIG. 2.
Figure 5:
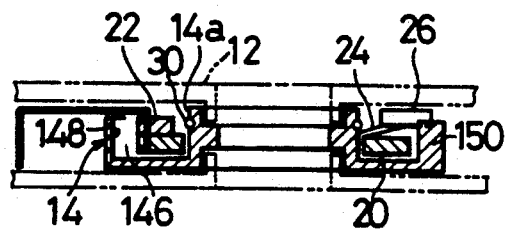
FIG. 5 is a sectional view taken along the line V—V of FIG. 4.

Preferred embodiments of a cassette tape of the present invention will be described with reference to the accompanying drawings. Reference numerals of the same type in the drawings designate components of the same type or corresponding type throughout the entire drawings. FIGS. 1 to 7 show an embodiment of a cassette tape according to the present invention. A cassette tape 10 comprises a case 12, a pair of reels 14 and 16 rotatably contained in the case 12, and a magnetic tape 18. The reels 14 and 16 may be used in both a supply side and a take-up side according to the feeding direction of the magnetic tape 18, but for the convenience of description, the pair of reels 14 and 16 are respectively called "a supply reel 14 and a take-up reel 16". Magnetic tapes 18 having predetermined lengths in which one of the ends of both the tapes 18 are fixed are respectively wound on the supply reel 14 and the take-up reel 16. Projections 142 radially inwardly extending to be rotated by a take of recorder/reproducer system are integrally formed at the center of the supply reel 14, and a recess 146 is formed inside a take-up drum 144. A plurality of projections 150 extending radially inwardly are provided at an equal interval on a cylindrical inner wall 148 for forming the recess 146, and one of them is formed with a tape end fixing unit 152.

A circular interlocking plate or connecting member 20 is movably engaged within the recess 146 of the supply reel 14. A bearing 22 is provided on the outer periphery of the upper surface of the interlocking plate 20, and an adjusting button 26 is mounted on the outer periphery of its radially opposite side through a supporting spring 24. The supporting spring 24 is formed in a bent plate shape, fixed at its one end to the interlocking plate 20 via a fulcrum 24a and mounted at the other end with the adjusting button 26. A known locking/unlocking mechanism, not shown, for stopping the adjusting button 26 at a second position (FIG. 5) when the adjusting button 26 is pressed down from a first position (FIG. 3) and returning the adjusting button 26 to the first position by the recoiling force of the supporting spring 24 when the adjusting button 26 is again pressed down is provided between the adjusting button 26 and the interlocking plate 20. An opening 12a is formed at the position of the case 12 corresponding to the regulating button 26, and when the adjusting button 26 is disposed at the first position, the adjusting button 26 is disposed in the opening 12a.

A control member or pin 28 has one end 28a rotatably supported to the bearing 22 having an axis parallel to the rotating axis of the supply reel 14, a portion 28b bent perpendicularly from the bearing portion of the one end 28a to be extended, and the other end 28c further extending downward in parallel with the center line of the bearing. The control pin 28 is rotated at the bearing 22 as a center, and the end 28c of the control pin 28 can be contacted with the surface of the magnetic tape 18.

The interlocking plate 20 contained in the recess 146 of the supply reel 14 is loosely engaged with the inner cylindrical wall 14a formed with its central hole of the interlocking plate 20 at the supply reel 14, vertically positioned by a ring pin 30 engaged with the cylindrical wall 14a, and stably rotated. When the adjusting button 26 is disposed at the first position, the interlocking plate 20 is not engaged with the projection 150 formed at the supply reel 14, and can be relatively rotated with respect to the supply reel 14 around the rotating axis of the supply reel 14. When the adjusting button 26 is pressed down to be disposed at the second position, the adjusting button 26 provided on the interlocking plate 20 is engaged with one of the projections 150 formed on the supply reel 14 to disable the relative rotation of the interlocking plate 20 and the supply reel 14.

Then, the operating and the using method of the cassette tape 20 of the embodiment of the present invention constructed as described above will be described.

When the adjusting button 26 is disposed at the first position in the opening 12a formed at the case 12, the interlocking plate 20 is separated from the supply reel 14 in a steady state, the end 28c of the control pin 28 is disposed at a radially outwardly separated position of the magnetic tape 18, and the supply reel 14 can be freely rotated. The magnetic tape 18 can be freely reciprocated in this state, similarly to the conventional ordinary cassette tape, across the entire length from the stating end to the finishing end of the magnetic tape 18 between the supply reel 14 and the take-up reel 16.

Figure 6:
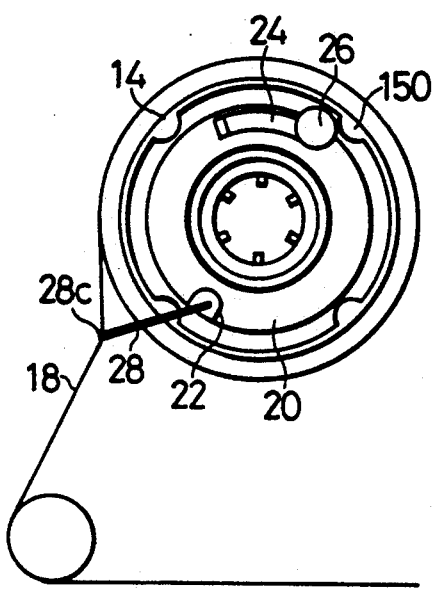
FIG. 6 is an enlarged plan view of a reel unit for explaining the state that the control pin of the tape length adjusting mechanism is engaged with a tape.

For example, if a specific range of the entire length of the already recorded magnetic tape 18 is desired to be repeatedly reproduced, a tape length regulator of the present invention is operated at the last magnetic tape position of the object to be reproduced. First, the cassette tape 10 is loading in a tape recorder/reproducer system, reproduced, and when the tape 10 is arrived at the last of the range of the object to be reproduced, the feeding tape is stopped. The cassette tape 10 is removed from the tape recorder/reproducer system, the adjusting button 26 is pressed to the second position. Then, the cassette tape 10 is recharged in the tape recorder/reproducer system. The tape recorder/reproducer system is operated, and the cassette tape 10 is fed in the same direction as that before the tape 10 is removed by reproducing or fast forward feeding. The supply reel 14 is received by a rotary force from the tape recorder/reproducer system to start rotating counterclockwise, but the projection 150 of the supply reel 14 disposed adjacently to the adjusting button 26 is immediately engaged with the adjusting button 26 to integrally rotate the supply reel 14 with the interlocking plate 20. Since the control pin 28 is also rotated at the same time as the rotation of the interlocking plate 20, the end 28c of the control pin 28 disposed at the position separated from the outermost portion of the tape 18 wound on the supply reel 14 is also moved toward the tape portion extending in its tangential direction. When the end 28c of the control pin 28 is engaged with the tape portion extended in its tangential direction and the supply reel 14 and the interlocking plate 20 are further rotated, the control pin 28 is moved together with the interlocking plate 20 while the end 28c of the control pin 28 is fluctuating at the bearing 22 as a center. Therefore, as shown in FIG. 6, the tangentially extending portion of the tape 18 is pulled in the rotating direction of the supply reel 14 by the end 28c of the control pin 28. Thus, the tension to be operated at the tape 18 is increased to operate a tension detecting mechanism (not shown) of the tape recorder/reproducer system, and the feeding tape 18 is stopped.

Figure 7:
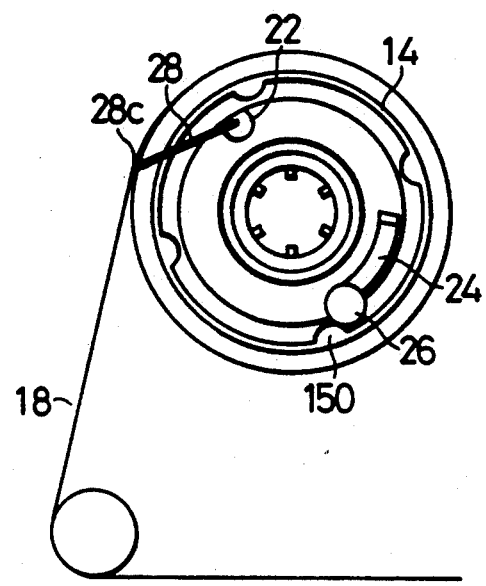
FIG. 7 is an enlarged plan view of a reel unit for explaining the state that the control pin of the tape length adjusting mechanism is wound with the tape.

When the tape 18 is rewound from the take-up reel 16 toward the supply reel 14 in this state, the supply reel 14 and the interlocking plate 20 are, since the adjusting button 26 is disposed at the pressed second position, integrally rotated clockwise. When the supply reel 14 is rotated substantially one revolution, the end 28c of the control pin 28 is contacted with the inner surface of the tangentially extending direction of the tape 18. When the supply reel 14 and the interlocking plate 20 are further rotated, as shown in FIG. 7, the control pin 28 is fluctuated counterclockwise at the bearing 22 as a center, and the end 28c of the control pin 28 is engaged to be held between the tapes 18. Thus, the tape 18 can be continuously wound on the supply reel 14 in the state that the end 28c of the control pin 28 is engaged between the tapes 18 as it is.

When the rewound tape 18 is fed from the supply reel 14 toward the take-up reel 16 by reproducing or fast forward feeding, the end 28c of the control pin 28 is disposed above the tape 18 immediately before the control pin 28 is disposed at the longitudinal position of the tape to be previously set as its stopping position, the control pin 28 is engaged with the tangential portion of the tape 18 when the control pin 28 is disposed at its set position, the tension of the tape 18 is increased similarly to the above-described state, and the feeding tape 18 is again stopped.

If the once set feeding or stopping position of the tape is altered or released at its setting, the cassette tape 10 stopped at the stopped position is removed from the tape recorder/reproducer system, the supply reel 14 is slightly manually rotated to match the adjusting button 26 to the opening 12a of the case 12, the adjusting button 26 is pressed and may be returned to the first position.

Figure 8:
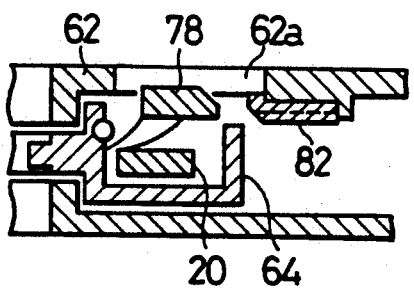
FIG. 8 is a partial sectional view similar to FIG. 3, illustrating a modified example of an adjustment button locking mechanism.

In the embodiment described above, the adjusting button 26 is locked to be set and reset at the second position when it is pressed, and the locking of the adjusting button 26 is released when it is pressed. However, the present invention is not limited to the particular embodiment. For example, as shown in FIG. 8, a slider 82 movable between the opening 62a of a case 62 and a supply reel 64 is provided therebetween, the slider 82 is moved to the supply reel 64 to set an adjusting button 78 (to move to the second position), and the slider 82 is moved to the case 62, and the adjusting button 78 may be reset (returned to the first position). In this case, it is preferable to form oblique portions, as shown, at the engagement starting ends of the slider 82 and the adjusting button 78.

Figure 9:
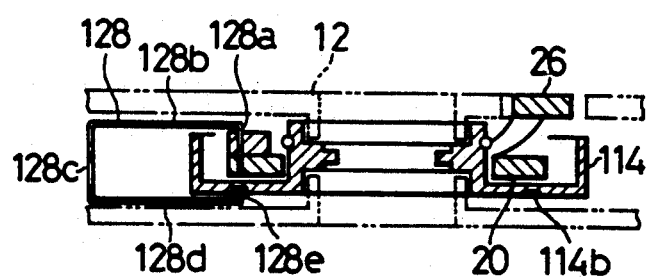
FIG. 9 is a sectional view similar to FIG. 3, illustrating a modified example of the control pin.

Further, in order to enhance the strength of the control pin while reducing in its thickness, it may be formed in the shape as shown in FIG. 9. In this case, a control pin 128 has a bearing portion 128a, a portion 128b disposed on the upper surface of a supply reel 114, a portion 128c parallel to the axis of the supply reel 114, further a portion 128d extending in parallel with the lower surface of the supply reel 114 and an end portion 128e parallel to the rotating axis of the supply reel 114. An annular groove 114b is formed on the lower surface of the supply reel 114, and the end 128e of the control pin 128 is movably engaged with the groove 114b of the supply reel 114. When the control pin 128 is formed in this shape, the forming portion of the control pin 128 is formed in a rectangular shape substantially closed, and two supporting portions of the control pin 128 are formed when it is engaged with the tape, thereby improving its strength.

Then, another embodiment of a cassette tape according to the present invention will be described by referring to FIGS. 10 and 11. In the previous embodiment, when the control pin is operated to stop the feeding tape, a slightly large tension is applied to the tape. However, in the conventional ordinary cassette tape, reinforced lead tape portions are provided at the starting and finishing ends of the tape. Thus, the large tension to be operated at the tape when an automatic device for stopping or reversing the tape of the tape recorder/reproducer system is operated is received by the lead tape portions to protect the magnetic tape recording portion. However, when the above-described adjusting mechanism is provided to stop or reverse the tape at the arbitrary longitudinal position, the lead tape portion cannot be provided along the entire magnetic tape since the stopping position of the tape is variable. Or, if the tape is increased in its thickness over the entire length so as to enhance the strength of the tape as protection against the increase in the tension of the tape when the tape recorder/reproducer system is automatically operated, the length of the tape to be contained in one cassette is shortened, additionally it is not economic, and not practical as well. Therefore, in this another embodiment of the present invention, a tape protecting function at the time of feeding and reversing is also provided in addition to the tape length adjusting function.

Figure 10:
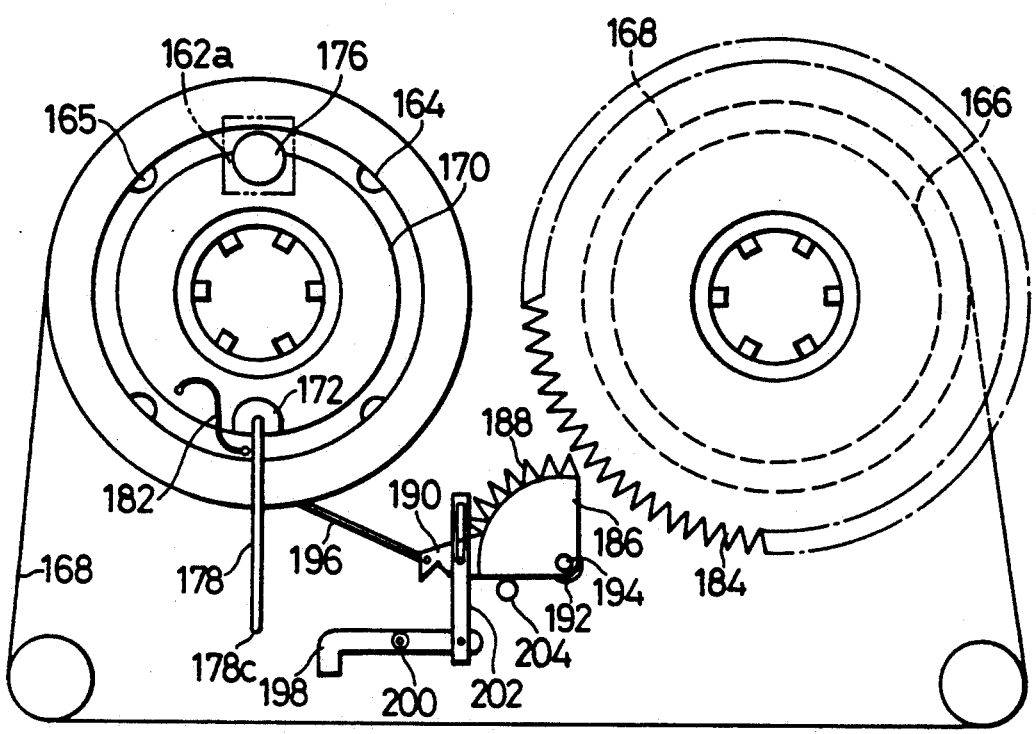
FIG. 10 is a partial plan view of another embodiment of a cassette tape in which the cover half of a case is removed, illustrating the state that a tape length adjusting mechanism is not operated.
Figure 11:
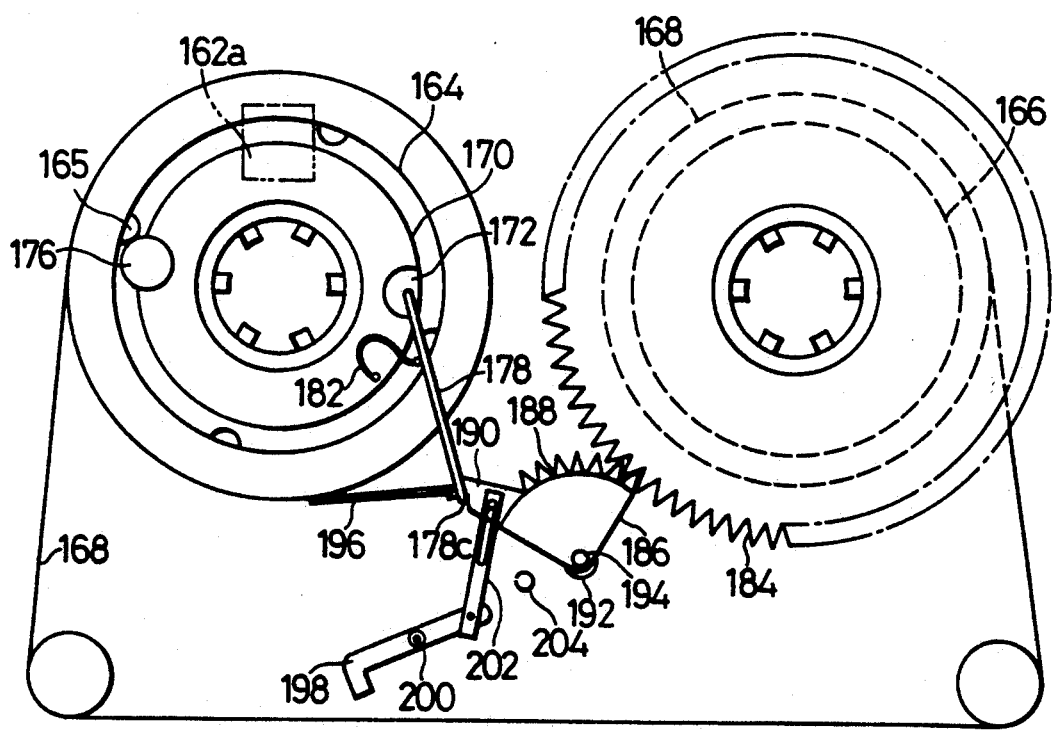
FIG. 11 is a partial plan view showing the state that the tape length adjusting mechanism of the cassette tape of FIG. 10 is operated.

FIGS. 10 and 11 are plan views of the portion of the case of the cassette tape in which the cover half of the case is removed, as partial plan views illustrating the state that a tape length adjusting mechanism is not operated and the state that the tape length adjusting mechanism is operated. A control pin 178 has a similar shape to that shown in FIG. 3, and is supported by a bearing 172. An S-shaped weak leaf spring 182 is provided at an interlocking plate 170 near the bearing 172. The control pin 178 is freely rockable at the bearing 172 as a center counterclockwise from the radial position, but is received by a small resistance by the spring 182 in the clockwise movement.

A reel gear 184 is integrally formed on the outer periphery of one hub portion of a take-up reel 166. A starting plate 186 is formed substantially in a sector shape, sector gears 188 are formed on the outer periphery of the starting plate 185, an arm portion 190 is formed, and a pivotal shaft 194, pivotally rotatably supported by a bearing 192, is provided in the case. The starting plate 186 is rockable at the bearing 192 as a center. When the starting plate 186 is rotated clockwise in the drawings, the sector gears 188 can be engaged with the reel gear 184. A pin-supported guide 196 is formed at the end of the arm portion 190, and its end is lightly contacted with the surface of the tape 168 by the spring action. The guide 196 is adapted to guide the control pin 178 in either rotating direction when the interlocking plate 170 is coupled to the supply reel 164 and rotated together.

A stop lever 198 for operating the automatic stopping device of a tape recorder/reproducer system is supported at its intermediate portion by a bearing 200 formed at the case, coupled at its one end to the starting plate 186 by a connecting rod 202, and occupied at the other end in the shape and at the position for operating the automatic stopping device of the tape recorder/reproducer system oppositely to the tape 168. The other arrangement is substantially similar to that of the previous embodiment described above.

The manipulation and operation of another embodiment of the present invention will be described.

When the adjusting button 176 is disposed at the first position in the opening 162a formed at the case, the control pin 178 is disposed in an angular range between the tape portion extending tangentially from the tape 168 wound on the supply reel 164 and the guide 196. The end 178c of the control pin 178 is disposed at the position radially outwardly separated from the magnetic tape 168, the supply reel 164 is freely rotatable, and the magnetic tape 168 can be freely reciprocated along the entire length from the starting end to the finishing end of the magnetic tape 168 between the supply reel 164 and the take-up reel 166.

When the stopping position of the tape is set, the cassette tape is first loaded in the tape recorder/reproducer system, the system is reproduced, and the feeding tape is stopped when the tape arrived at the last of the range of the object to be reproduced. The cassette tape is then removed from the tape recorder/reproducer system, the adjusting button 176 is pressed, and the adjusting button 176 is set to the second position. The cassette tape is charged in the tape recorder/reproducer in this state, and the tape 168 is rewound from the take-up reel 166 toward the supply reel 164. Then, since the adjusting button 176 is disposed at the pressed second position, the adjusting button 176 is engaged with the projection 165 of the supply reel 164 disposed immediately near the rear position of the rotating direction thereof. Thus, the supply reel 164 and the interlocking plate 170 are integrally rotated clockwise. When the supply reel 164 is further rotated, the end 178c of the control pin 178 is contacted with the inner surface of the tangentially extending portion of the tape 168, the control pin 178 is fluctuated counterclockwise at the bearing 172 as a center to be disposed to be held between the tapes 168. Thus, the tape 168 is continuously wound on the supply reel 164 in the state that the end 178c of the control pin 178 is engaged between the tapes 168 as it is.

When the rewound tape 168 is fed from the supply reel 164 toward the take-up reel 166 by reproducing or fast forward feeding as described above, the end 178c of the control pin 178 is disposed above the tape 168 at the previously set tape longitudinal position of the control pin 178, moved from the end of the guide 196 along the guide 196, and engaged with the arm portion 190 of the starting plate 186. As shown in FIG. 11, the end 178c of the control pin 178 slightly pulls up the starting plate 186 to engage the sector gear 188 with the reel gear 188 of the take-up reel 166, and the sector gear 188 is received by the rotary force from the reel gear 184. Since the starting plate 186 is rotated clockwise at the bearing 192 as a center through the sector gears 188 by the rotation of the reel gear 184, the connecting rod 202 is pulled up, and the stop lever 198 is rotated at the bearing 200 as a center in cooperation with the connecting rod 202. As a result, the opposite side end of the stop lever 198 actuates the automatic stopping device of the tape recorder/reproducer system, thereby stopping the feeding tape 168.

After the sector gear 188 is engaged with the reel gear 184, a groove having a play is formed at either the connecting rod 202 or the starting plate 186 so that a force for lifting the stop lever 198 is not operated at the control pin 178, thereby coupling both.

When the supply reel 165 and the take-up reel 166 for rewinding the cassette tape stopped as described above are reversely rotated, the reel gear 184 is rotated clockwise, the sector gear 188 is rotated counterclockwise, and the engagement of both is disengaged. The starting plate 186 is rotated at the bearing 192 as a center by the rotation of the sector gear 188 and the spring action of the guide 196 until it is contacted with a stopper 204. The stop lever 198 is rotated clockwise at the bearing 200 as a center in cooperation with it. Thus, the starting plate 196 and the stop lever 198 are returned to their standby positions. On the other hand, the tape 168 is sequentially wound by the rotation of the supply reel 164 in the state that the end 178c of the control pin 178 is engaged between the tapes 168. Thus, the tape stop adjusting device of this embodiment is prepared for its next operation.

If once set stopping position of the cassette tape is altered or the set tape is released, the cassette tape stopped at the stopping position is removed from the tape recorder/reproducer system, the supply reel 164 is slightly manually rotated to match the adjusting button 176 to the opening 162 of the case, the adjusting button 176 is pressed, and may be returned to its first position.

In the embodiment described above, the rotary force of the take-up reel is used so as to stop the feeding tape. Therefore, a large tension is not applied to the tape when the tape is stopped.

Figure 12:
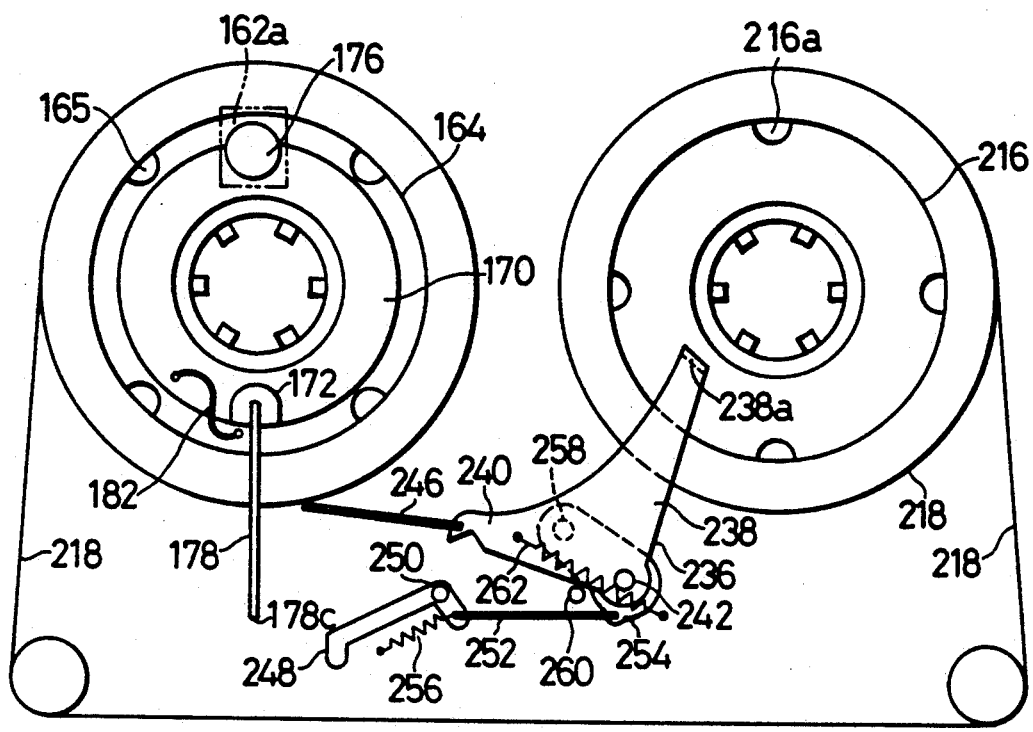
FIG. 12 is a partial plan view showing still another embodiment of a cassette tape in which the cover half of a case is removed, illustrating the state that a tape length adjusting mechanism is not operated.
Figure 13:
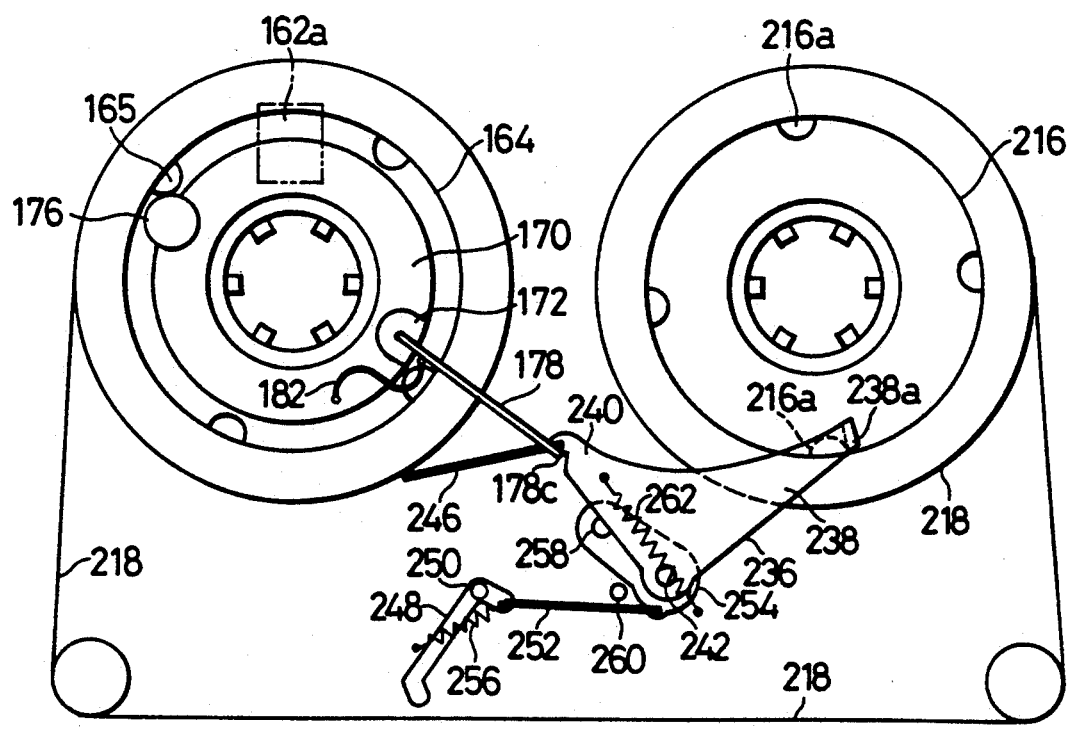
FIG. 13 is a partial plan view showing the state that the tape length adjusting mechanism of the cassette tape of FIG. 12 is operated.
Figure 14:
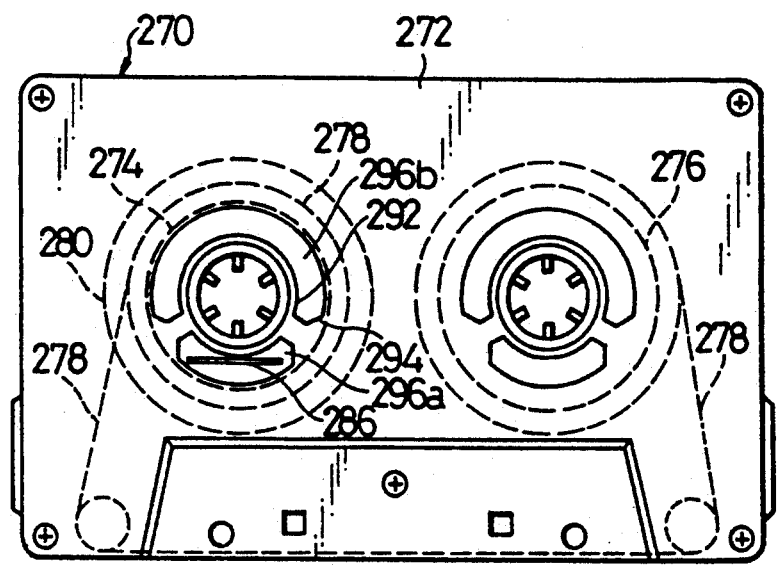
FIG. 14 is a plan view showing still another embodiment of a cassette tape of this invention.
Figure 15:
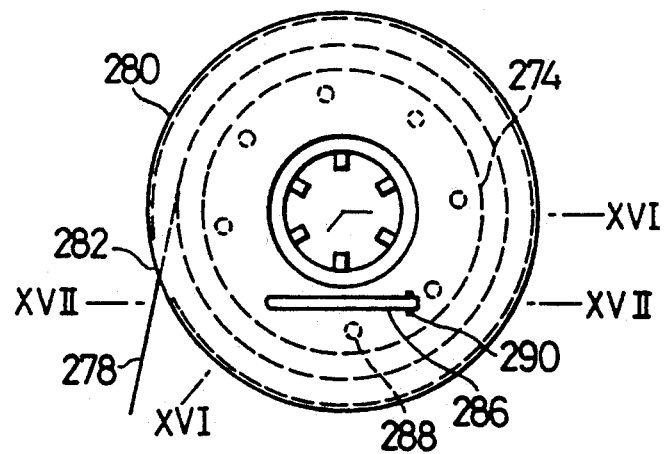
FIG. 15 is an enlarged plan view of a reel unit of the cassette tape of FIG. 14.
Figure 16:
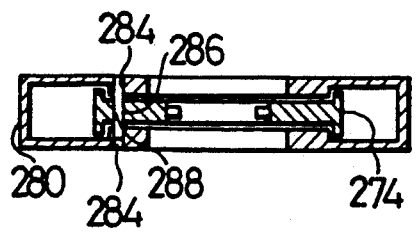
FIG. 16 is a sectional view taken along the line XVI—XVI of FIG. 15.
Figure 17:
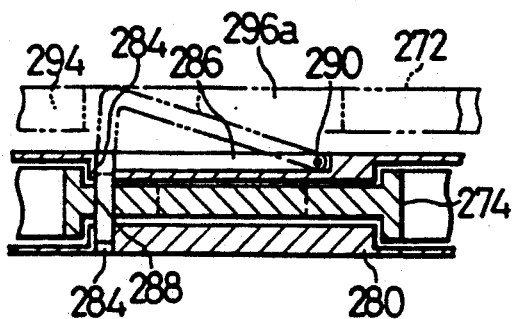
FIG. 17 is a sectional view taken along the line XVII—XVII of FIG. 15.

Then, still another embodiment of a cassette tape of the present invention will be described by referring to FIGS. 12 and 13. FIGS. 12 and 13 are partial plan views showing the cassette tape in which the cover half of the case is removed, as partial plan views illustrating the state that a tape length adjusting mechanism is not operated and the state that the tape length adjusting mechanism is operated. In the embodiment described above shown in FIG. 10, the gear mechanism is used to interlock the take-up reel to the starting plate. However, a space for occupying the gear mechanism is considerably large to thereby limit the length of the tape to be contained therein. Therefore, in this embodiment, the cassette tape having an adjusting mechanism in which longer tape can be contained is provided.

The arrangement of the supply reel of the cassette tape of the embodiment is similar to that of the embodiment shown in FIG. 10. Further, a plurality of projections 216a are formed in the take-up drum of a take-up reel 216.

A stop lever 248 for operating an automatic stopping device of a tape recorder/reproducer system supports the intermediate portion of a bearing 250 provided at the case, is coupled at its one end to a cushion plate 254 via a connecting rod 252, and occupied at the other end in shape and is position for operating the automatic stopping device of the tape recorder/reproducer system. One end of a spring 256 extended between the end of the stop lever 248 with the connecting rod 252 and the case is engaged with the end of the stop lever 248.

The cushion plate 254 is supported at its one end to a bearing 258 provided at the case, and provided at the other end with a bearing 242 for supporting a braking plate 236. The cushion plate 254 is rockable at the bearing 258 as a center, pulled by a spring 256 through the connecting rod 252, and normally stood by as engaged with a stopper 260 provided at the case.

The braking plate 236 has a first arm 238 and a second arm 240. A shaft attached to the intermediate portion of the braking plate 236 is supported by the bearing 242 fixed to the cushion plate 254. The end of the first arm 238 is bent perpendicularly toward the interior of the drum of the take-up reel 216 to form a pawl 238a extending in parallel with the rotating axis of the take-up reel 216. The pawl 238a is to be able to be engaged with a projection 216a formed at the take-up reel 216. A guide 246 is mounted at the end of the second arm 240, and the end of the guide 246 is lightly contacted with the surface of the tape 218 wound on the supply reel 164 by the spring force thereof. A spring 262 is extended between the intermediate portion of the second arm 240 and the case. This spring 262 is arranged to alter the position of the braking plate 236 to a snapping position when the braking plate 236 is rocked around the bearing 242. When the braking plate 236 is disposed at a standby state, the pawl 238a is separated from the projection 216a inside the take-up reel 216, and the end of the second arm 240 is disposed on the moving route of the end 178c of the control pin 178.

The manipulation and operation of this embodiment of the invention will be described.

When the adjusting button 178 is disposed at the first position in the opening 162a formed at the case, the supply reel 164 is freely rotatable, and the magnetic tape 218 is freely reciprocated over the entire length from the starting end to the finishing end of the magnetic tape 218 between the supply reel 164 and the take-up reel 216.

The stopping position of the tape is set similarly to that of the embodiment shown in FIG. 10 as described above.

When the cassette tape set at its stopping position is charged in the tape recorder/reproducer system and the rewound tape 218 is fed from the supply reel 164 toward the take-up reel 216 by reproducing or fast forward feeding, the end 178c of the control pin 178 is disposed above the tape 168 as the control pin 178 is previously disposed at the set tape length position, moved from the end of the guide 246 along the guide 246, and engaged with the second arm 240 of the braking plate 236. The end 178c of the control pin 178 slightly lifts the braking plate 236 thereby to engage the pawl 238a of the end of the first arm 238 with the projection 216a formed at the take-up reel 216 by a snapping operation by means of the elastic force of the spring 262 by the braking plate 236. When the take-up reel 216 is further rotated from the state that the pawl 238a is engaged with the projection 216a, the bearing 242 provided at the cushion plate 254 for rotatably supporting the braking plate 236 rotates counterclockwise integrally with the cushion plate 254 around the bearing 258. Therefore, the movement of the cushion plate 254 is transmitted to the stop lever 248 through the connecting rod 252, and the stop lever 248 is rotated at the bearing 250 as a center. As a result, the opposite side end of the stop lever 248 actuates the automatic stopping device of the tape recorder/reproducer system, thereby stopping the feeding tape 218.

When the supply reel 164 and the take-up reel 215 for rewinding the cassette tape stopped as described above are reversely rotated, the pawl 238a of the braking plate 236 is pressed from behind by the projection 216a of the take-up reel 216, and the braking plate 236 is rotated around the bearing 242 to be returned to the standby position for snapping by the operation of the spring 262. The cushion plate 254 and the stop lever 248 are also returned to the standby position by the spring 256 in cooperation with the returning operation of the braking plate 236. Thus, the tape stopping regulator of this embodiment is prepared for the next operation.

In the embodiment of the invention described above, the snapping braking plate and the cushion plate are employed to perform a shock absorber function. Therefore, the adjusting mechanism of the embodiment is operated as a protecting device for inhibiting an unreasonable force, not only at the tape, but also through the entire system even if the tape is stopped at the time of feeding at a high speed.

A still further embodiment of a cassette tape of the present invention will be described with reference to FIGS. 14 to 17. A cassette tape 270 has a supply reel 274 and a take-up reel 276 contained in a case 272. An outer drum 280 substantially in an annular shape concentrically with the supply reel 274 is rotatably provided around the supply reel 274. An opening 282 as an exit for a tape 278 is formed at the outer periphery of the outer drum 280. A through hole 284 parallel to the rotating axis of the outer drum 280 is provided at the outer drum 280, and an L-shaped knock pin 286 is mounted on the upper surface of the outer drum 280. A plurality of holes 288 are formed at an equal interval on the same circumference of the supply reel 274 corresponding to the holes 284 of the outer drum 280. The knock pin 286 is rockably mounted at a pin fulcrum 290 on the outer surface of the outer drum 280, and formed at the other end with a head to be engaged within the holes 284 and 288. Windows 296a and 296b are formed at the central portion of the supply reel 274 on the upper and lower surfaces of the case 272 except the bearing 292 and the bearing arm 294. The bent corner of the knock pin 286 is engaged with the bearing arm 294 in the state that the head of the knock pin 286 is inserted into the holes 284, 288 as indicated by imaginary lines in FIG. 17, thereby stopping the rotation of the outer drum 280. When the head of the knock pin 286 is pressed into the holes 284 and 288, it is snugly fitted in the holes by the elastic forces thereof, thereby integrally coupling the supply reel 264 and the outer drum 280. Since the knock pin 286 is flat on the upper surface of the outer drum 280 so that the corner of the knock pin 286 is not engaged with the bearing arm 294 in the state that the head of the knock pin 286 is deeply inserted into the holes 284 and 288, the outer drum 280 is rotatable together with the supply reel 274. The knock pin 286 inserted into the holes 284 and 288 can be removed from the holes by the elastic force of the knock pin 286 by pressing the end of the knock pin 286 from below. The windows 286a and 296b formed at the case 272 are preferably formed to be as large as possible to easily operate the knock pin 286.

The way of using and operation of the cassette tape 270 constructed as described above will now be described. The cassette tape 270 in the state that the knock pin 286 is not inserted into the holes 284 and 288 can be recorded and reproduced over the entire length from the starting end to the finishing end of the tape 278 similarly to the ordinary tape per se. In this case, since the the bearing arm 294 is engaged with the corner of the knock pin 286, the outer drum 280 is steadily disposed, the tape 278 is reciprocated between the supply reel 274 and the take-up reel 276 through the opening 282 of the outer drum 280, and wound on the supply reel 274 or the take-up reel 276.

The tape 278 is fed from the supply reel 274 toward the take-up reel 276 and stopped at an arbitrary position. This cassette tape 270 is removed from the tape recorder/reproducer system, the knock pin 286 is inserted into the holes 284 and 288, thereby integrating the supply reel 274 with the outer drum 280. This cassette tape 280 is again charged in the tape recorder/reproducer system, and the tape 278 is fed from the take-up reel 276 toward the supply reel 274. Then, the tape 278 is wound on the outer periphery of the outer drum 280. Thereafter, the tape 278 is reproduced to be reciprocated between the take-up reel 276 and the outer drum 280. Here, the tape portion of the tape remaining in the outer drum 280 as wound on the supply reel 274 is not removed unless the knock pin 286 is removed from the holes 284 and 288.

In all the embodiments described above, the tape length adjusting mechanism is provided at one side reel. However, the present invention is not limited to the particular embodiments. For example the tape length adjusting mechanisms may be provided at both the reels with the same arrangement.

The cassette tape according to the present invention can be limited arbitrarily in a range of an object to be recorded and reproduced over the entire tape length, and the tape length adjustment can be performed steplessly and simply in response to its utility. When the cassette tape of the invention is recorded or reproduced by using an automatic reverse type tape recorder/reproducer system, a continuously recording and reproducing can be performed almost without vacant portion of the tape at the time of reversing the tape.

The preferred embodiments illustrated and described in the drawings and specification are exemplified only. The present invention is not limited to the particular embodiments described above. This invention can be variously modified without departing from the spirit, scope and essential features thereof. Therefore, the above-described embodiments are mere illustration only at all respects, and not interpreted in a limited manner. The scope of the present invention is appended by the claims, but not limited by the text of the specification, and the modifications and alterations belonging to the equivalent scope of the claims should all included in the scope of the present invention.

What is claimed is:

1. A tape cassette for playing in a tape player that can determine a position along a length of tape comprising:
    means for transporting tape for recording and reproducing information, including a rotatable reef or storing the tape, and
    means for creating a sufficient tension force on the tape to activate the tape player to stop movement of the tape at a position determined by an operator intermediate the beginning and end of a length of tape whereby the operator can limit the playing of a tape to a predetermined length of tape play, including an interlocking plate member that can releasably rotate with the reel, means for engaging the interlocking plate member to rotate with the reel and a tape control member movably mounted on the interlocking plate member to engage the tape and define an arbitrary position when the means for engaging is activated.

2. A tape cassette for playing on a tape player, comprising:
    first and second reels that are rotatably mounted in the cartridge;
    a length of tape connected to the respective first and second reels and capable of being wound and unwound, respectively, on the reels, and
    control means on the cartridge for permitting an operator to set a fixed stop position to the playing of the tape at any position along the length of tape, including a contact member that contacts the tape and is interwound into the tape coils as it rotates in the winding direction about a reel and an interlocking plate member that movably supports the contact member and is releasably mounted for rotation with one of the first and second reels.

3. A tape cassette comprising:
    a cassette case;
    a pair of reels rotatably arranged in said case, respectively;
    a magnetic tape arranged between said reels and reversibly wound on said reels, and
    means for stopping the feeding of said magnetic tape at an arbitrary position along a longitudinal direction of said magnetic tape, including a connecting member having an engaging portion with said magnetic tape and detachably connecting with one of said reels, said engaging portion is engaged with said magnetic tape at the time of operation of said connecting member when connected with said one reel, and said engaging portion is disengaged from said magnetic tape at the time of non-operation of said connecting member, said connecting member comprises an annular member capable of rotation with said one reel, connecting means for connecting said annular member to said one reel, and said engaging portion comprises a control pin movably supported on said annular member and engageable with said magnetic tape to define the arbitrary position.

4. A tape cassette according to claim 3, wherein said connecting means comprises a projection formed on said one reel, and an engaging member attached to said annular member.

5. A tape cassette according to claim 4, wherein said engaging member is attached to said annular plate through a spring, and comprises a locking mechanism for holding said engaging member at a first or a second position.

6. A tape cassette according to claim 5, wherein said locking mechanism comprises a slider movable between said case and said one reel.

7. A tape cassette according to claim 3, wherein said control pin comprises a portion extending substantially radially of said one reel, and a portion parallel to the rotating axis of said reel and radially outward of said magnetic tape.

8. A tape cassette according to claim 7, wherein said control pin further comprises a portion radially extending along a lower surface of said one reel, and an end portion parallel to said rotating axis radially inwardly of said reel, an annular groove is formed on the lower surface of said one reel, and said end portion is engaged with said annular groove.

9. A tape cassette comprising;
    a cassette case;
    a pair of reels rotatably arranged in said case, respectively;
    a magnetic tape arranged between said reels and reversibly wound on said reels, and
    means for stopping the feeding of said magnetic tape at an arbitrary position along the length of said magnetic tape, including a connecting member releasably engaged to rotate with at least one of the reels and a movably supported control member that engages and disengages with the magnetic tape depending on the engagement of the connecting member, the control member is pivotally mounted on the connecting member for movement therewith and when engaged with the magnetic tape defines a stop position for feeding said magnetic tape.

10. A tape cassette for playing in a tape player that can mechanically determine an arbitrary position along the length of a tape comprising:
    a cassette case;
    tape;
    means for transporting the tape in the cassette case, including at least one reel rotatably mounted in the cassette case for winding and unwinding the tape;

a connecting member mounted adjacent the reel and rotatable with the reel when engaged;
means for engaging the connecting member with the reel to define an arbitrary position along the length of the tape, and
a tape control member movably mounted on the connecting member and rotatable with the connecting member when the connecting member is engaged, the tape control member being wound on the reel with the tape to engage the tape and define the arbitrary position when the means for engaging is activated.

* * * * *